United States Patent [19]
Frey et al.

[11] Patent Number: 5,852,065
[45] Date of Patent: Dec. 22, 1998

[54] LOW EMISSION, CELL OPENING SURFACTANTS FOR POLYURETHANE FLEXIBLE AND RIGID FOAMS

[75] Inventors: John Herbert Frey, Alburtis, Pa.; David Robert Battice, Prudenville, Mich.; Karla Asuncion Sabram, Macungie, Pa.; Lenin James Petroff, Bay City, Mich.

[73] Assignee: Air Products and Chemicals, Inc., Allentown, Pa.

[21] Appl. No.: 7,595

[22] Filed: Jan. 15, 1998

[51] Int. Cl.$^6$ .................................................. C08G 18/00
[52] U.S. Cl. ..................... 521/112; 521/172; 521/174; 528/26
[58] Field of Search ....................... 521/112, 172, 521/174; 528/26

[56] References Cited

U.S. PATENT DOCUMENTS

| | | | |
|---|---|---|---|
| 3,560,544 | 2/1971 | Haluska | 260/448.2 |
| 4,686,240 | 8/1987 | Bailey | 521/103 |
| 4,751,251 | 6/1988 | Thornsberry | 521/112 |
| 4,751,253 | 6/1988 | Tylends | 521/114 |
| 4,929,646 | 5/1990 | Nichols | 521/137 |
| 5,192,812 | 3/1993 | Farris et al. | 521/112 |
| 5,296,625 | 3/1994 | O'Lenick, Jr. | 556/437 |

*Primary Examiner*—Morton Foelak
*Attorney, Agent, or Firm*—Michael Leach

[57] ABSTRACT

A method for preparing a polyurethane flexible molded or rigid foam by reacting an organic polyisocyanate with a polyol in the presence of urethane catalyst, water as a blowing agent, optionally a silicone surfactant cell stabilizer, and a cell opener characterized in that the cell opener comprises the reaction product of 1,1,1,3,5,5,5-hepta (hydrocarbyl)-trisiloxane coupled with polyalkyleneoxide mono allyl ether and capped with a C1–C20 hydrocarbyl group-containing succinic anhydride.

19 Claims, No Drawings

LOW EMISSION, CELL OPENING SURFACTANTS FOR POLYURETHANE FLEXIBLE AND RIGID FOAMS

FIELD OF THE INVENTION

The invention relates to making polyurethane flexible and rigid foams using silicone surfactants as cell openers.

BACKGROUND OF THE INVENTION

Flexible molded polyurethane foam requires mechanical crushing to open foam cells and prevent shrinkage and improve dimensional stability of the foam pad. Current mechanical methods for cell opening consist mainly of crushing, vacuum rupture or time pressure release. Mechanical methods usually result in incomplete or inconsistent cell opening and require a foam producer to invest in additional machinery. A chemical method for cell opening would be preferred.

Rigid polyurethane foam has a closed cell structure by its nature, but some applications require an open cell structure. Cell openers could lead to dimensional stability improvements in various rigid applications or could provide the open cell structure required for rigid foam filled vacuum panels. It would be desirable to have a chemical additive that would open the cells of a flexible or rigid foam since mechanical crushing is not an option for rigid foams.

In addition, the industry is driving more and more to reduced emissions for additives so it would be beneficial to have a cell opening additive with low emissions. In flexible molded foam, reduced emissions of additives can lead to reduced fogging on interior automobile windshields. In rigid foam, reduced emissions could be beneficial for establishing stable, low pressure vacuums in rigid foam filled vacuum panels.

U.S. Pat. No. 4,929,646 discloses preparing flexible polyurethane foams using certain high molecular weight, high functionality poly(oxyethylene) compounds as cell openers and softeners.

U.S. Pat. No. 4,751,253 discloses a cell opening dimensionally stabilizing additive for making flexible polyurethane foam which comprises an ester reaction product of a long chain acid with polyethylene or polypropylene glycols and/or contains free acid to provide for desired acid value.

Silicone surfactant cell openers are especially effective in cell opening because their surfactant properties allow them to become active at a cell interface between the polymer and the air.

U.S. Pat. No. 5,192,812 discloses certain silicone surfactants, which are organomodified polydimethylsiloxane structures, as cell openers in the manufacture of polyurethane foam. This patent explicitly covers polydimethylsiloxanes since the backbones contain (Me2SiO)x groups where x is at least one.

U.S. Pat. No. 3,560,544 discloses triorganosiloxy end-blocked polyoxyalkylene siloxane polymers with suggested utility as surfactants, wetting agents, detergents, emulsifying agents, fiber lubricants and foam stabilizers for urethane foams.

U.S. Pat. No. 4,751,251 discloses a surfactant composition for rigid urethane foams comprising an organic surfactant, a siloxane-polyoxyalkylene surfactant and water or an alcohol, or both. An organomodified polydimethylsiloxane copolymer which has been capped with dodecyl succinic anhydride is suggested for use in rigid polyurethane foam.

U.S. Pat. No. 4,686,240 discloses certain "foam modifiers" for producing water-blown, flexible polyurethane foams. Column 10/5+ suggests the alkali and alkaline earth metal salts of carboxy organosiloxanes including triorganosiloxy end-blocked polyoxyalkylene siloxane polymers, such as cyclic anhydrides reacted with a organomodified polydimethylsiloxane and neutralized with an alkali metal hydroxide. Example 27 shows a foam modifier based on a siloxane alcohol.

U.S. Pat. No. 5,296,625 discloses silicone alkoxylated esters which contain terminal carboxyl groups as solubilizers.

The present invention involves a different class of silicone copolymers which do not have a polydimethylsiloxane character. As a result, this new class of materials is low fogging and provides cell opening. In addition, relatively low levels of the additive are necessary to create cell opening.

SUMMARY OF THE INVENTION

The invention is a method for preparing polyurethane flexible molded and rigid foam using a class of silicone surfactants which do not have a polydimethylsiloxane character. The method comprises reacting an organic polyisocyanate and a polyol in the presence of a catalyst composition, a blowing agent, optionally a cell stabilizer, and as a cell opening agent a composition which is the reaction product of a 1,1,1,3,5,5,5-hepta(hydrocarbyl)trisiloxane coupled with a polyalkyleneoxide mono allyl ether and capped with a succinic anhydride.

The preferred compounds of this invention are lower in emissions because they are not organomodified polydimethylsiloxane materials. Organomodified polydimethylsiloxanes cause higher emissions due to the lower molecular weight end of the polydimethylsiloxane distribution.

In addition to cell opening and having low emission properties, these silicone materials may also act, in certain instances, as cell stabilizers. These materials afford a fine celled foam with high airflow and low shrinkage.

DETAILED DESCRIPTION OF THE INVENTION

The silicone cell openers used in the preparation of the flexible molded and rigid foams are the reaction product of a hepta(hydrocarbyl)trisiloxane, preferably 1,1,1,3,5,5,5-heptamethyltrisiloxane, of the formula

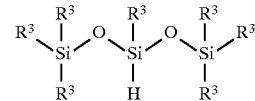

where $R^3$ is a C1–C20 monovalent hydrocarbyl group, coupled with a polyalkylene oxide mono allyl ether and capped with a succinic anhydride. Monovalent hydrocarbyl groups suitable as $R^3$ are exemplified by alkyl groups such as methyl, ethyl, propyl, butyl, hexyl, octyl, decyl, dodecyl and octadecyl, cycloaliphatic groups such as cyclohexyl, aryl groups such as phenyl, tolyl, and xylyl, and aralkyl groups such as benzyl and phenylethyl. It is preferred that $R^3$ is methyl or phenyl. The several $R^3$ groups can be identical or different, as desired, and preferably at least 50% of all $R^3$ groups are methyl.

The polyalkylene oxide moiety may comprise ethylene oxide, propylene oxide, butylene oxide or a blend thereof, but preferably is polyethylene oxide $(EO)_x$. The number of polymerized alkylene oxide units may range from 2 to 30, preferably 5 to 15.

Suitable hydrocarbyl group-containing succinic anhydrides contain a hydrocarbyl group such as an alkyl or alkenyl group. The hydrocarbyl group of the succinic anhydride may contain 1 to 65, preferably 6 to 16, carbon atoms, such as for example n-hexenyl, polyisobutenyl and dodecenyl (also called tetrapropenyl).

The preferred reaction product is 1,1,1,3,5,5,5-heptamethyltrisiloxane coupled with dodecaethyleneoxide $(EO)_{12}$ mono allyl ether and capped with dodecenyl (C12) succinic anhydride (DDSA).

Suitable silicone cell opener reaction products should comprise at least 90 wt %, preferably 95 wt %, of silicone compounds (total silicone species basis) represented by the following generic structure:

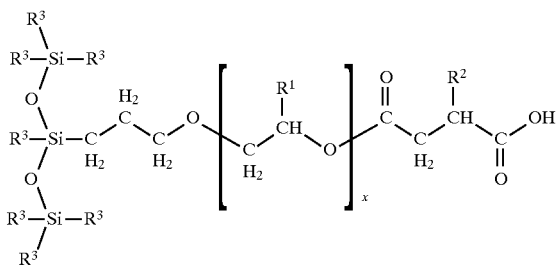

where $R^1$ is hydrogen or a C1–C2 alkyl group, $R^2$ is hydrogen or a C1–C20 hydrocarbyl group, $R^3$ is a C1–C20 monovalent hydrocarbyl group and x is an integer ranging from 2 to 30.

These silicone surfactants can be prepared according to the methods well known in the art, for example as taught in U.S. Pat. No. 3,560,544, which is incorporated by reference, and can optionally, but preferably, be used in combination with other silicone surfactants well known as cell stabilizers for making polyurethane foams. When used in such combination, the silicone cell opener reaction products according to the invention may compose about 5–95 wt % of the total silicone surfactant composition.

The silicone cell openers according to the invention are employed in the manufacture of polyether and polyester flexible molded and rigid polyurethane foam in the manner known to the art. In producing the polyurethane foams using these cell openers, one or more polyether or polyester polyols are employed for reaction with a polyisocyanate to provide the urethane linkage. Such polyols have an average of typically 2.0 to 3.5 hydroxyl groups per molecule.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Suitable urethane catalysts useful in the present invention are all those well known to the worker skilled in the art including tertiary amines such as triethylenediamine, N-methylimidazole, 1,2-dimethylimidazole, N-methylmorpholine, N-ethylmorpholine, triethylamine, tributylamine, pentamethyldiethylenetriamine, pentamethyldipropylenetriamine, triethanolamine, dimethylethanolamine and bisdimethylaminodiethylether, and organotins such as stannous octoate, stannous acetate, stannous oleate, stannous laurate, dibutyltin dilaurate, and other such tin salts.

Other typical agents which may be found in the polyurethane foam formulations include chain extenders such as ethylene glycol and butanediol; crosslinkers such as diethanolamine, diisopropanolamine, triethanolamine and tripropanolamine; cell stabilizers such as silicones; and especially blowing agents such as water, liquid carbon dioxide, acetone, pentane, HFCs, HCFCs, CFCs, methylene chloride and the like.

A general polyurethane flexible molded foam formulation having a 1–3 lb/ft$^3$ (16–48 kg/m$^3$) density (e.g., automotive seating) containing a silicone surfactant cell opener composition according to the invention would comprise the following components in parts by weight (pbw):

| Flexible Foam Formulation | pbw |
|---|---|
| Polyol | 20–100 |
| Polymer Polyol | 80–0 |
| Cell Stabilizer | 0–3; pref 0.1–2.5 |
| Silicone Cell Opener | 0.003–3; pref 0.05–2.5 |

| Flexible Foam Formulation | pbw |
|---|---|
| Blowing Agent | 2–4.5 |
| Crosslinker | 0.5–2 |
| Catalyst Composition | 0.3–2 |
| Isocyanate Index | 70–115 |

In the present invention the preferred blowing agent for making the flexible molded foams is water at 1 to 6 parts per hundred polyol (pphpp), especially 2 to 4.5 pphpp, optionally with other blowing agents.

Other additives may of course be employed to impart specific properties to the foam. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the silicone surfactants (cell opener and cell stabilizer) to the reaction mixture as a premixture with one or more of the blowing agent, polyol, water, and catalyst components.

It is to be understood that the relative amounts of the various components of the foam formulation are not narrowly critical. The polyol and polyisocyanate are present in the foam-producing formulation in the major amount. The relative amounts of these two components in the mixture are well known to the art. The blowing agent, catalysts, and silicone surfactant cell opener and cell stabilizer are each present in a minor amount sufficient to foam the reaction mixture. The catalysts are present in a catalytic amount, i.e., that amount necessary to catalyze the reactions to produce the urethane and urea at a reasonable rate, and the surfactant is present in the amount sufficient to impart the properties desired and to stabilize the reacting foam, for example, 0.3 to 3 pphp.

In a typical preparation, the polyol, water, silicone surfactants, amine catalyst, optional tin catalyst and optional blowing agent are blended together and finally TDI is mixed in and the composition is allowed to foam and polymerize.

A general polyurethane rigid foam formulation containing the silicone cell opener composition according to the invention would comprise the following components in parts by weight (pbw):

| Rigid Foam Formulation | (pbw) |
|---|---|
| Polyol | 100 |
| Cell Stabilizer | 0–4; pref 0.05–3.5 |
| Silicone Cell Opener | 0.005–4; pref 0.05–3 |
| Water | 1–8 |
| Auxiliary Blowing Agent | 0–55 |
| Catalyst | 0.5–6 |
| Isocyanate Index (preferably MDI) | 90–300 |

EXAMPLE 1

1,1,1,3,5,5,5-Heptamethyltrisiloxane coupled with dodecaethyleneoxide (EO12) mono allyl ether and capped with dodecenyl (C12) succinic anhydride (DDSA) was prepared by mixing a silicone surfactant [64.5 wt %; 1,1,1,3,5,5,5-heptamethyltrisiloxane coupled with dodecaethyleneoxide (EO12) mono allyl ether] and dodecenyl succinic anhydride [35.5 wt %; Humphry Chemical] under nitrogen for two hr at 120° C. After two hr the capping reaction was complete. The final product which comprised 99.1 wt % (based on total silicone species) of the following structure A is identified as Cell Opener A in the following examples.

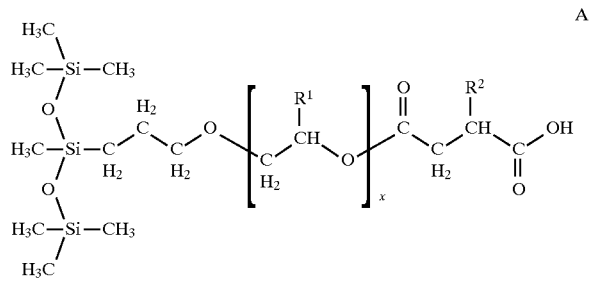

where $R^1$ is hydrogen, $R^2$ is dodecenyl and x is 12.

EXAMPLES 2–7

The procedure of Example 1 was followed except that other hydrocarbyl group-containing succinic anhydrides available from Humphrey Chemicals were used to prepare the following Cell Openers B–G:

| CELL OPENER | HYDROCARBYL SUCCINIC ANHYDRIDE |
|---|---|
| A | Dodecenyl (Tetrapropenyl) |
| B | n-Octenyl |
| C | iso-Octadecenyl |
| D | Di-isobutenyl |
| E | Nonenyl |
| F | n-Decenyl |
| G | Polyisobutenyl |

In the Examples below the silicone Cell Openers A–G were compared to a competitive cell opener. In the Examples and Tables the following materials were used:

Arcol E 519 SAN polyol from Arco Chemical (OH#= 24.4)

Arcol E 648 polyether polyol from Arco Chemical (OH#= 35)

Cell Opener PA—EO-PO copolymer polyol (OH#=33)

CP 6001 polyether polyol from Dow Chemical (OH#=28)

DABCO 33LV® catalyst from APCI

DABCO® BL-11 catalyst from Air Products and Chemicals, Inc. (APCI)

DABCO BL-17 catalyst from APCI

DABCO® DC2585 polydimethylsiloxane surfactant from APCI

DABCO DC5164 polydimethylsiloxane surfactant from APCI

DABCO DC5169 organomodified polydimethylsiloxane surfactant from APCI

DABCO DC5357 organomodified polydimethylsiloxane surfactant from APCI

DABCO™ DEOA-LF—diethanolamine/water (85/15) form APCI

Desmodur 3230 MDI from Bayer AG

Desmophen T-65 TDI from Bayer AG

Desmophen T-80 TDI from Bayer AG

H2050—proprietary amine catalyst from APCI

POLYCAT® 5 catalyst from APCI.

POLYCAT 8 catalyst from APCI.

POLYCAT 41 catalyst from APCI.

Rubinate M MDI from ICI.

Silicone Surfactant PA—organomodified polydimethylsiloxane surfactant/cell opener Voranol 490 polyol from Dow Chemical Silicone Surfactant PA is a prior art organomodified polydimethylsiloxane and comprises 44 wt % (total silicone species basis) of the silicone of structure A above. Because of the lower molecular weight end of the polydimethylsiloxane distribution, Silicone Surfactant PA will produce emissions at elevated temperatures. Headspace chromatograms, which depict the composition of the headspace of the Silicone Surfactant PA and the Cell Opener A liquids at 130° C., show that much lower levels and fewer species of volatile silicone components are released with the preferred Cell Opener A, thus affording a reduced emission, i.e., low fogging, cell opening agent.

EXAMPLE 8

In this example MDI flexible molded polyurethane foam was prepared from the following components in parts by weight (pbw):

| COMPONENT | pbw |
| --- | --- |
| CP6001 | 100 |
| Total Water | 3.4 |
| DEOA-LF | 0.74 |
| Dabco DC2585 | 1.0 |
| Dabco BL11 | 0.15 |
| Dabco 33LV | 0.3 |
| H2050 | 0.5 |
| Cell Opener | 0.5 |
| Desmodur 3230 MDI | MDI index = 100 |

Polyol, water, DEOA and amine catalysts were preblended the day before foam preparation. The polyol premix was measured into a ½ gallon (2 liter) cup and the silicone surfactant and cell opener were added. Using a Servodyne dispersator with a 3 inch (7.6 cm) disc mixing blade, and controller—set at 6000 RPM loaded, the cup of liquid was mixed 25 seconds. The MDI was added and the liquid was mixed for 6 seconds. The mixture was poured into a 12×12×4 inch (30×30×10 cm), 126° F. (52° C.) mold, which was sprayed with a solvent based release agent, and the cup was poured for 5 seconds, and the mold was immediately closed. For each foam, force-to-crush (FTC) and % shrinkage were obtained. The premix was incubated to control the temperature.

Table 1 provides the shrinkage results for the variety of hydrocarbyl succinic anhydride capped reaction products of 1,1,1,3,5,5,5-heptamethyltrisiloxane coupled with polyalkyleneoxide mono allyl ether of Examples A–G. Table 1 shows that Cell Openers A and G, Surfactant PA and Cell Opener PA improved foam shrinkage; however, Surfactant PA produces high emissions and Cell Opener PA is typically used at use levels of 1 to 2 pphpp. The data also shows that Cell Openers A–G provided improved FTC values compared to no cell opener.

TABLE 1

| Cell Opener* | % Foam Shrinkage** | Force-To-Crush (lb/50 in$^2$; N/323 cm$^2$) | Hydrocarbyl Succinic Anhydride Capping Agent |
| --- | --- | --- | --- |
| A | 4 | 189; 841 | tetrapropenyl s.a |
| B | 29 | 209; 930 | n-octenyl s.a. |

TABLE 1-continued

| Cell Opener* | % Foam Shrinkage** | Force-To-Crush (lb/50 in$^2$; N/323 cm$^2$) | Hydrocarbyl Succinic Anhydride Capping Agent |
| --- | --- | --- | --- |
| C | 28 | 214; 952 | iso-octadecenyl s.a. |
| D | 30 | 223; 992 | di-isobutenyl s.a. |
| E | 31 | 228; 1014 | nonenyl s.a. |
| F | 34 | 212; 943 | n-decenyl s.a. |
| G | 1 | 103; 458 | polyisobutenyl s.a. |
| None | 26 | 270; 1201 | |
| Surfactant PA | 4 | 130; 578 | |
| Cell Opener PA | 2 | 86; 383 | |

*Cell Opener PA at 1.0 pphpp, all others at 0.5 pphpp
**Foam shrinkage on a pad without mechanical crushing

EXAMPLE 9

In this Example TDI flexible molded polyurethane foam was prepared using the following components in parts by weight (pbw):

| COMPONENT | pbw |
| --- | --- |
| Arcol E 648 | 50 |
| Arcol E519 | 50 |
| Dabco DC5043 | 1.5 |
| Cell Opener | 0.75 |
| Added Water | 3.35 |
| DEOA-LF | 1.65 |
| Dabco 33 LV | 0.50 |
| DabcoBL 17 | 0.19 |
| TDI Index = 100 | |

The two polyols were mixed in a container, and the water, DEOA-LF, and amine catalysts were mixed in another container. The polyol mixture was incubated at 73° F. (23° C.). The polyol was measured out into a ½ gallon (2 liter) cup and the silicone cell stabilizer and silicone cell opener were added. Using the Servodyne dispersator with a 3 inch (7.6 cm) disc mixing blade, and controller—set at 6000 RPM loaded, the cup of liquid was mixed 20 seconds. The water, DEOA-LF, and amine blend were then added. The cup of liquid was mixed 20 seconds, then the TDI was added and mixed for approx. 5 seconds. The mixture was poured into a 12×12×4 inch (30×30×10 cm), 155° F. (68° C.) mold, which was sprayed with a solvent based release agent, the cup was poured for 5 seconds, and the mold was immediately closed. For each foam, the following data was obtained: FTC, % shrinkage, bulk stability, and surface stability. Demold time was 275 seconds after mixing, with the FTC (force to crush) time being 330 seconds after mixing.

Table 2 provides results for the various hydrocarbyl succinic anhydride capped reaction products of heptamethyltrisiloxane coupled with polyalkyleneoxide mono allyl ether (Cell Openers A–G). The table shows that Cell Openers A–G afforded improved foam shrinkage and FTC values compared to the control foam.

TABLE 2

| Cell Opener | Force to Crush (lb/50 in$^2$, N/323 cm$^2$) | % Shrinkage* | Bulk Stability | Surface Quality |
| --- | --- | --- | --- | --- |
| None | 274; 1219 | 23 | 4.5 | 4.5 |
| A | 173; 770 | 7 | 4.2 | 4.5 |
| B | 182; 810 | 6 | 4.2 | 4.5 |
| C | 215; 956 | 8 | 4.25 | 4.5 |

TABLE 2-continued

| Cell Opener | Force to Crush (lb/50 in²·, N/323 cm²) | % Shrinkage* | Bulk Stability | Surface Quality |
|---|---|---|---|---|
| D | 180; 801 | 5 | 4.2 | 4.8 |
| E | 176; 783 | 6 | 4.2 | 4.5 |
| F | 165; 734 | 4 | 4.2 | 4.5 |
| G | 217; 965 | 9 | 1.75 | 2 |

Bulk Stability: 1 = large cells, 5 = uniform fine cells
*Surface Quality: 1 = large surface cells, 5 = fine surface cells
*Shrinkage measured on a pad without mechanical crushing.
*Cell Opener G at 0.005 pphpp, all others at 0.75 pphpp

EXAMPLE 10

In this Example MDI rigid molded polyurethane foam was prepared using the components (parts by weight) shown in Table 3. The formulation is typical of a conventional 141b/water co-blown appliance formulation.

Properties for the rigid foams made with and without silicone surfactant Cell Opener A are shown in Table 3. Dabco DC5357 surfactant is an organomodified polydimethylsiloxane and is used commercially in HCFC-141b rigid appliance foam formulations. Cell Opener A provided a more open foam as seen in the % open cell measurement. Although the k-factor was also higher with Cell Opener A (Run 2) as a result of the more open cell structure, the foam of Run 2 was still a viable foam since a k-factor of 0.157 is typically observed in all-water blown rigid systems as show by Run 1.

TABLE 3

| COMPONENTS | Run 1 | Run 2 |
|---|---|---|
| Voranol 490 polyol | 100.00 | 100.00 |
| DC 5357 cell stabilizer | 2.00 | 0.13 |
| Cell Opener A | — | 2.00 |
| Polycat 5 | 0.20 | 0.20 |
| Polycat 8 | 1.60 | 1.60 |
| Water | 2.50 | 2.50 |
| HCFC-141b | 25.00 | 25.00 |
| Rubinate M MDI | 177.39 | 177.39 |
| FOAM PROPERTIES | | |
| Initial K Factor[1] | 0.157 | 0.230 |
| % Open Cells | 21 | 64 |

[1](BTU-in/hr-ft 2-F;)

STATEMENT OF INDUSTRIAL APPLICATION

The invention affords a method for making water blown polyurethane flexible molded and rigid foams with improved cell opening.

We claim:

1. A method for preparing a polyurethane flexible molded or rigid foam which comprises reacting an organic polyisocyanate with a polyol in the presence of urethane catalyst, water as a blowing agent, optionally a silicone surfactant cell stabilizer, and a cell opener comprising the reaction product of a 1,1,1,3,5,5,5-hepta(hydrocarbyl)trisiloxane of the general structure

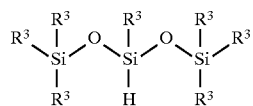

coupled with a polyalkyleneoxide mono allyl ether and capped with a succinic anhydride, the reaction product comprising at least 90 wt % of a silicone compound, based on total silicone species, which is represented by the general structure

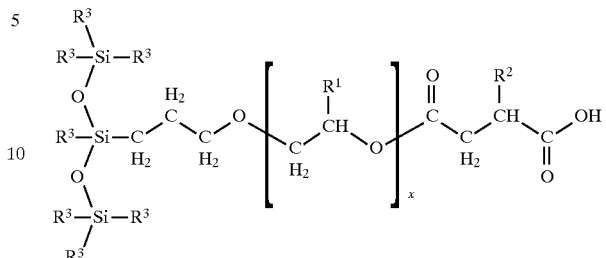

where $R^1$ is hydrogen or a C1–C2 alkyl group, $R^2$ is hydrogen or a C1–C65 hydrocarbyl group, $R^3$ is a C1–C20 hydrocarbyl group and x is an integer ranging from 2 to 30.

2. The method of claim 1 in which $R^3$ is methyl or phenyl.

3. The method of claim 1 in which the polyalkyleneoxide has 5 to 15 alkylene oxide units.

4. The method of claim 1 in which the succinic anhydride is a C6–C16 hydrocarbyl group-containing succinic anhydride.

5. The method of claim 3 in which the polyalkylene oxide is polyethylene oxide.

6. The method of claim 1 in which the succinic anhydride is polyisobuteneyl succinic anhydride or dodecenyl succinic anhydride.

7. The method of claim 6 in which the polyethylene oxide has 12 ethylene oxide units.

8. The method of claim 1 in which $R^1$ is hydrogen, $R^2$ is a C6–C16 hydrocarbyl group, $R^3$ is methyl or phenyl and x is an integer ranging from 5 to 15.

9. The method of claim 1 in which $R^1$ is hydrogen, $R^2$ is dodecenyl or polyisobutenyl, $R^3$ is methyl or phenyl and x is an integer ranging from 5 to 15.

10. The method of claim 2 in which $R^3$ is methyl.

11. A polyurethane flexible molded foam composition prepared by mixing the following components in parts by weight (pbw):

| | (pbw) |
|---|---|
| Polyol | 20–100 |
| Polymer Polyol | 80–0 |
| Cell Stabilizer | 0–3 |
| Silicone Cell Opener | 0.003–3 |
| Water | 1–8 |
| Auxiliary Blowing Agent | 0–20 |
| Urethane Catalyst | 0.3–3 |
| Isocyanate Index | 70–115 | in which the silicone cell opener comprises the reaction product of 1,1,1,3,5,5,5-hepta(hydrocarbyl)trisiloxane of the general structure

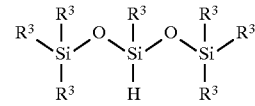

coupled with a polyalkyleneoxide mono allyl ether and capped with a succinic anhydride, the reaction product comprising at least 90 wt % of a silicone compound, based on total silicone species, which is represented by the general structure

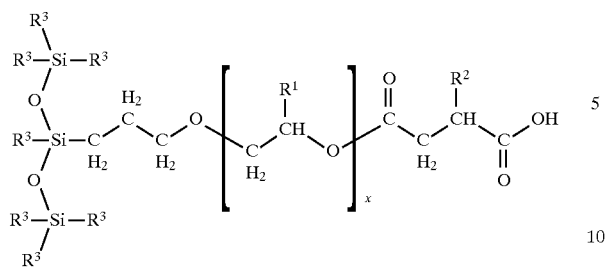

where $R^1$ is hydrogen or a C1–C2 alkyl group, $R^2$ is hydrogen or a C1–C65 hydrocarbyl group, $R^3$ is methyl or phenyl and x is an integer ranging from 2 to 30.

12. The polyurethane flexible molded foam composition of claim 11 in which $R^1$ is hydrogen, $R^2$ is a C6–C16 hydrocarbyl group, x is an integer ranging from 5 to 15, the cell stabilizer is present at 0.1–2.5 pbw and the cell opener at 0.05–2.5 pbw.

13. The polyurethane flexible molded foam composition of claim 12 in which the reaction product comprises at least 95 wt %, based on total silicone species, of a silicone compound represented by the general structure.

14. The polyurethane flexible molded foam composition of claim 12 in which the reaction product comprises about 99 wt % of a silicone compound, based on total silicone species, which is represented by the general structure where $R^2$ is dodecenyl, $R^3$ is methyl and x is 12.

15. A polyurethane rigid foam composition prepared by mixing the following components in parts by weight (pbw):

|  | (pbw) |
| --- | --- |
| Polyol | 100 |
| Cell Stabilizer | 0–4 |
| Silicone Cell Opener | 0.005–4 |
| Water | 1–8 |
| Auxiliary Blowing Agent | 0–55 |
| Catalyst | 0.5–6 |
| Isocyanate Index | 90–300 | in which the silicone cell opener comprises the reaction product of 1,1,1,3,5,5,5-hepta(hydrocarbyl)trisiloxane of the general structure

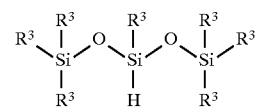

coupled with a polyalkyleneoxide mono allyl ether and capped with a succinic anhydride, the reaction product comprising at least 90 wt % of a silicone compound, based on total silicone species, which is represented by the general structure

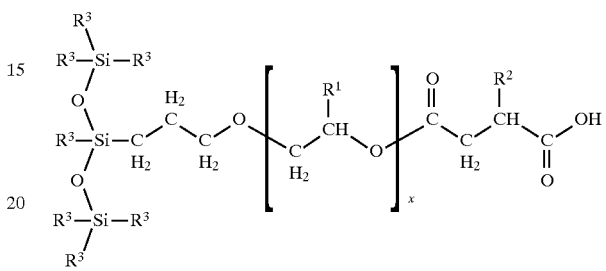

where $R^1$ is hydrogen or a C1–C2 alkyl group, $R^2$ is hydrogen or a C1–C65 hydrocarbyl group, $R^3$ is methyl or phenyl and x is an integer ranging from 2 to 30.

16. The polyurethane rigid foam composition of claim 15 in which $R^1$ is hydrogen, $R^2$ is a C6–C16 hydrocarbyl group, x is an integer ranging from 5 to 15, the cell stabilizer is present at 0.05–3.5 pbw and the cell opener at 0.05–3 pbw.

17. The polyurethane rigid foam composition of claim 16 in which the reaction product comprises at least 95 wt %, based on total silicone species, of a silicone compound represented by the general structure.

18. The polyurethane rigid foam composition of claim 16 in which the reaction product comprises about 99 wt % of a silicone compound, based on total silicone species, which is represented by the general structure where $R^2$ is dodecenyl, $R^3$ is methyl and x is 12.

19. The method of claim 1 in which the water is present at greater than about 5 parts per hundred polyol.

\* \* \* \* \*